United States Patent [19]
Miyazaki et al.

[11] 4,180,041
[45] Dec. 25, 1979

[54] INTERNAL COMBUSTION ENGINE WITH INTAKE ARRANGEMENT TO PRODUCE SWIRL IN COMBUSTION CHAMBER

[75] Inventors: Hiroaki Miyazaki, Kamakura; Yasuo Sakai, Yokohama; Tosimitu Matuoka, Yokosuka, all of Japan

[73] Assignee: Nissan Motor Company, Limited, Japan

[21] Appl. No.: 774,038

[22] Filed: Mar. 3, 1977

[30] Foreign Application Priority Data

Mar. 5, 1976 [JP] Japan .................... 51-23154

[51] Int. Cl.² .......................................... F02M 29/00
[52] U.S. Cl. .............................. 123/141; 123/188 M; 48/180 B
[58] Field of Search ................... 123/141, 188 M; 48/180 B, 180 R; 261/78 R, 79 R

[56] References Cited
U.S. PATENT DOCUMENTS

| | | | |
|---|---|---|---|
| 1,998,784 | 4/1935 | Mock | 123/141 |
| 3,408,992 | 11/1968 | Von Seggern et al. | 123/188 M X |
| 3,635,201 | 1/1972 | High | 123/141 X |
| 3,671,208 | 6/1972 | Medsker | 123/141 X |
| 3,820,522 | 6/1974 | Scherenberg | 123/141 X |
| 3,868,940 | 3/1975 | Kirchweger | 123/188 M |
| 3,874,357 | 1/1975 | List et al. | 123/141 X |
| 3,877,449 | 4/1975 | High | 123/141 X |
| 4,015,577 | 4/1977 | Elsbett et al. | 123/188 M |

FOREIGN PATENT DOCUMENTS

292093 5/1928 United Kingdom ............ 123/141

*Primary Examiner*—Ira S. Lazarus
*Attorney, Agent, or Firm*—Robert E. Burns; Emmanuel J. Lobato; Bruce L. Adams

[57] ABSTRACT

An internal combustion engine comprises a cylinder and an intake passageway opening into the cylinder. In order to secure sufficiently high volumetric efficiency at high speed under high load operating conditions, the intake passageway is so configured as to pass therethrough a sufficient volume required for the combustible charge to be drawn into the cylinder per unit time. The intake passageway is provided with swirl means for causing the combustible charge passing through the intake passageway to swirl in the cylinder. The swirl means comprises at least one flow restrictor means so arranged as to urge the combustible charge to enter into the cylinder in a tangent direction to the cylinder wall. Control means is provided whereby the flow restrictor means reduces effective flow area thereof at low speed under light load operating conditions, thus securing strong swirl, and the flow restrictor means increase effective flow area thereof at high speed under high load operating conditions, thus securing high volumetric efficiency.

14 Claims, 10 Drawing Figures

INTERNAL COMBUSTION ENGINE WITH INTAKE ARRANGEMENT TO PRODUCE SWIRL IN COMBUSTION CHAMBER

BACKGROUND OF THE INVENTION

The present invention relates to internal combustion engines and more particularly to intake arrangements to produce a swirl in each cylinder.

With conventional spark ignited internal combustion engines an intake passageway opening into each cylinder is so designed as to increase the volumetric efficiency of the engine at high speeds under high loads. For this end the passageway has a large cross sectional area, smooth corners and frictionless inner walls to reduce throttling effect, and it is so arranged and positioned, with respect to the cylinder, as to direct the combustible charge at the cylinder axis at an acute angle to and above a plane perpendicular to the cylinder axis. At low speed under light load operating conditions complete mixing of the combustible charge does not take plae and complete combustion takes place only part of the combustible charge and, as a result the conventional internal combustion engine has a high specific fuel consumption and high exhaust emissions at these conditions. At low speed under light load operating conditions when a volume for the combustible charge to be drawn into the cylinder is little, flow velocity of the combustible charge passing through the intake passageway becomes so slow that evaporation of fuel may not occur at a sufficiently high rate and that a swirl with a swirl rate high enough for complete mixing of the fuel with air may not be produced in the cylinder.

This is particularly a problem in the case of a combustion with high exhaust gas recirculation which necessiates sufficient mixing of the charge or, in the case of a combustion with very lean air/fuel mixture.

One possible way to let combustion take place all of the combustible charge in the cylinder at low speed under light load operating conditions is to advance the spark timing at these conditions to compensate for a slow flame propagation through the combustible charge. However, this measure remains problems that the conventional internal combustion engine has a high specific fuel consumption and high exhaust emissions at these conditions unsolved.

SUMMARY OF THE INVENTION

It is an object of the present invention to provide an internal combustion engine with a less complicated intake arrangement to produce a swirl strong enough for complete combustion at low speed under light load operating conditions.

It is another object of the present invention to provide an internal combustion engine with an intake arrangement to secure a flow velocity, of the combustible charge passing through an intake passageway opening to each cylinder, high enough for complete evaporation of the fuel and mixing of the fuel with air at low speed under light load operating conditions.

It is still another object of the present invention to provide an internal combustion engine with an intake arrangement which produces a swirl in each cylinder strong enough for complete combustion and secures a flow velocity in the intake passageway high enough for complete evaporation of the fuel and mixing of the fuel with air, and which secure high volumetric efficiency of the engine at high speed under high load operating conditions.

BRIEF DESCRIPTION OF THE DRAWINGS

The invention will be further described hereinafter with reference to the accompanying drawings, in which.

DESCRIPTION OF THE INVENTION

Figure 1:
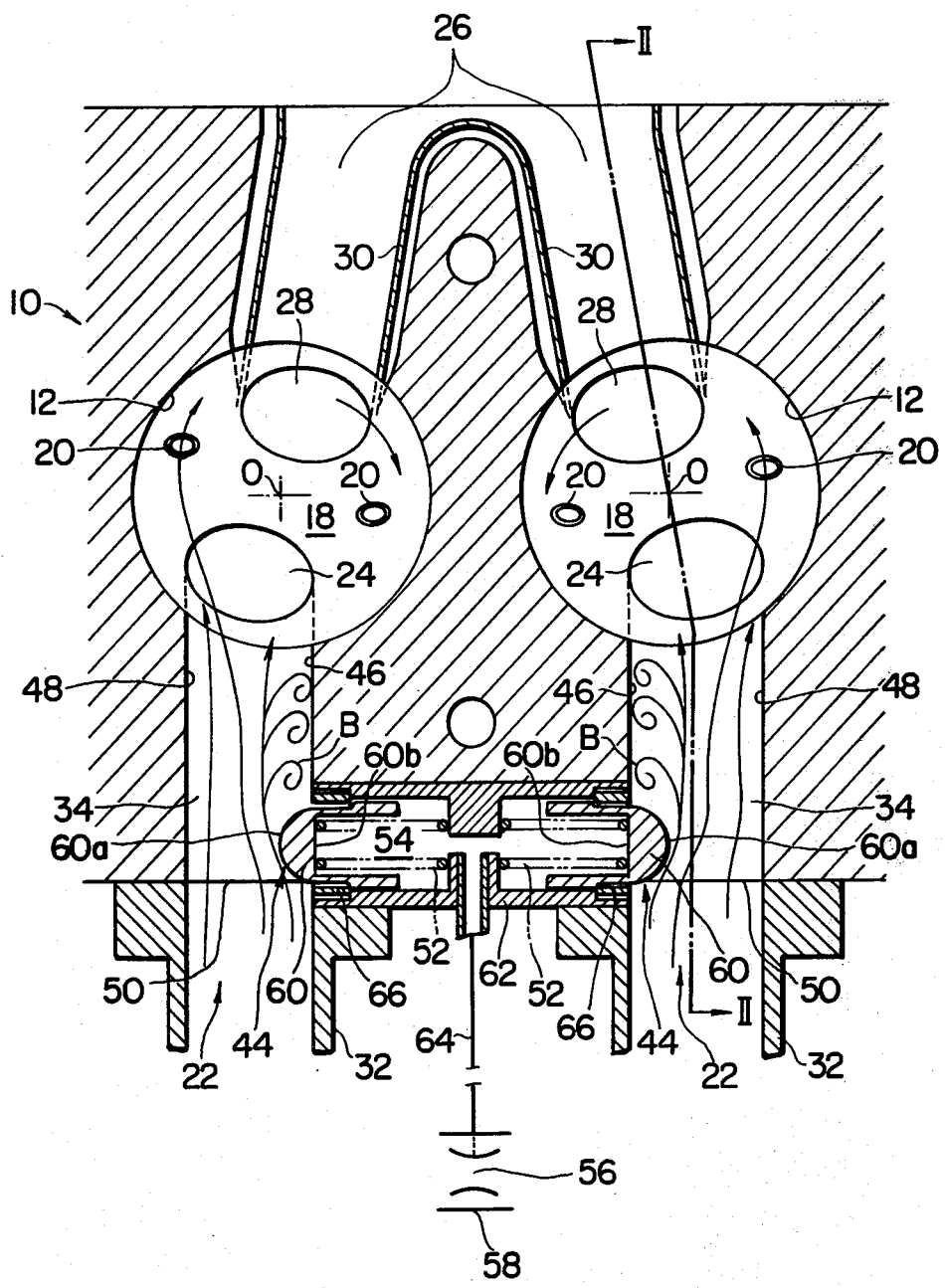
FIG. 1 is a transverse sectional diagrammatic view of a portion of an internal combustion engine showing a first embodiment of the invention.

Referring to the accompanying drawings, like reference numerals are used to designate like parts throughout all of the Figures.

Figure 2:
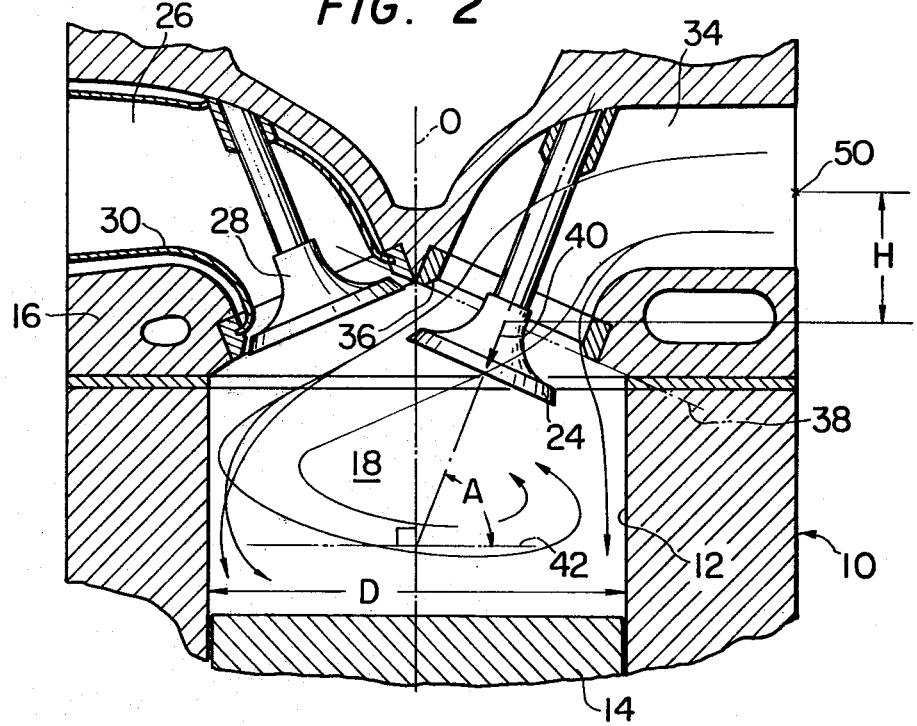
FIG. 2 is a section taken through the II—It shown in FIG. 1.

Referring particularly to FIGS. 1 and 2, the reference numeral 10 generally indicates an internal combustion engine of the invention and includes as is conventional a cylinder 12, a reciprocating piston 14 therein, a cylinder head 16 connected to the cylinder 12 with the cylinder, piston and head forming a combustion chamber 18. Two spark plugs 20 are positioned away from the longitudinal axis O of an near the cylinder wall of the cylinder 12. The combustible charge, such as air or air/fuel mixture, is drawn into the cylinder 12 through an intake passageway, generally indicated by the reference numeral 22, under the control of an intake valve 24, whereas, the exhaust gas is discharged out of the cylinder 12 through a siamesed exhaust port 26 under the control of an exhaust valve 28. The siamesed exhausted port 26 leads to the exhaust valves 28 of the adjacent two cylinders 12 and is installed with a port liner 30. The intake passageway includes as is conventional an intake manifold 32 and an intake port passage 34 leading from the intake manifold to the intake valve 24 through the cylinder head 16.

As best seen in FIG. 2, an intake port passage has a downstream end (with respect to flow of the combustible charge through the intake port) formed with a valve seat 36 of the intake valve 24. The downstream end of the intake port passage 34 is positioned within a first plane 38 having a unit vector 40, normal to the plane 38 and having its origin placed at the middle of the downstream end, directed toward the piston crown and an area disposed in the proximity of the cylinder axis O at an acute angle A to and above a second plane 42 perpendicular to the cylinder axis O.

Swirl means is provided in the intake passageway 22 for causing the combustible charge to swirl in the cylinder 12. The swirl means, as best seen in FIG. 1, comprises a flow restrictor means or projection 44 for restricting and deflecting flow of the combustible charge in the intake passageway 22 to urge combustible charge to enter into the cylinder 12 in substantially a tangent direction to the cylinder wall.

The flow restrictor means or projection 44 is disposed on that one 46 of the two opposed wall portions 46 and 48 of the intake passageway 42 which is positioned nearer to the cylinder axis O than the other wall portion 48. If the unit vector 40 is directed at the cylinder axis O, the flow restrictor may be disposed on either one of the two opposed wall portions of the intake passageway 22.

Preferably, the flow restrictor means 44 is positioned within an area disposed in the proximity of an upstream end 50, i.e., an end at which a branch of the intake manifold is attached, of the intake port passage 34.

The swirl means also comprises control means whereby the flow restrictor means 44 increases effective flow area of the flow restrictor means as flow velocity of the combustible charge passing through the intake passageway 22 increases.

The control means comprises a spring means 52 yeildably biasing the flow restrictor means 44 in a direction in a sense to reduce effective flow area thereof and chamber means 54 communicating with a venturi 56 of a carburetor 58 connected as is conventional to the intake passageway 22 for urging, against the bias action of the spring means 52, the flow restrictor means in the opposite direction in a sense to increase effective flow area thereof in response to an increase of a vacuum at the venturi 56.

The flow restrictor means 44 takes the form of a plunger 60 having a half-spherical head 60a protruding into the intake port passageway 34. The plunger 60 is slidably received in a hollow sleeve 62 to close each open end of the hollow sleeve. The hollow sleeve 62 and two plungers 60 cooperate to form an air-tight chamber. The air tight chamber communicates with the venturi 56 through a passage 64. The protrusion movement of the plunger 60 due to the bias action of the spring means 52 is limited by an annular stopper 66 fixedly coupled with the hollow sleeve 62. The plunger 60 is formed with an area 60b adapted to receive the venturi vacuum in the chamber 54.

At low speed under light load operating conditions, the plunger 60 is fully protruded into the intake port passage 34 as illustrated in FIG. 1. At these conditions the flow of the combustible charge passing through the intake port passage 34 is deflected toward the wall portion 48 by the head 60a of the plunger 60 and turbulent flow defined by small eddies B (see flow pattern shown in FIG. 1) occur at an area disposed just or immediately downstream of the protruded head 60a and in the proximity of the wall portion 46. The protrusion of the head 60a and the eddies B define resilient throttling means which reduces the effective flow area of the intake port passage 34 enough for the flow of the combustible charge passing through the intake passageway at low speed under light load operating conditions to increase its flow velocity to such a degree as to effect complete evaporation of the fuel and complete mixing of the fuel with air. Amount of protrusion of te head 60a of the plunger 60 and the location thereof in the intake passageway 22 are selected such that at low speed light load operating conditions the combustible charge is deflected and urged to enter into the cylinder in substantially a tangent direction to the cylinder wall. Experiments have shown that it is best to dispose the flow restrictor means 44 within an area in the proximity of the upstream end 50 of the intake port passage 34.

As the vacuum at the venturi 56 increases, which increases with an increase of flow velocity in the intake passageway 22 or of load on the engine, the head 60a of the plunger 60 is urged, against the bias of the spring means 52, inwardly of the sleeve 62 and, as a result the amount of protrusion of the head 60a decreases and effective flow area of the flow restrictor means 44 increases.

At high speed under high load operating conditions, therefore, the head 60a of the plunger 60 is fully retracted from the intake port passage 34 to provide a maximum effective flow area of the flow restrictor means 44, thus securing a sufficiently high volumetric efficiency of the engine at these conditions.

It will be noted that at low speed under light load operating conditions a swirl with a swirl rate high enough for the complete combustion of the combustible charge is secured and, at high speed under high load operating conditions a swirl with a swirl rate high enough for the complete combustion of the combustible charge is secured without lowering volumetric efficiency of the engine at these conditions.

In the preceding embodiment shown in FIGS. 1 and 2 as a control parameter the vacuum at the venturi 56 of the carburetor 58 is used but, such may be replaced with flow velocity of the combustible charge passing through the intake passageway 22 or, actuating angle of an accelerator link mechanism or, throttle opening degree of a carburetor throttle or, induction vacuum or, exhaust pressure. In actual use of each of the above control parameters except the vacuum at the carburetor venturi, a control apparatus is necessary which is so designed as to increase effective flow area of the flow restrictor 44 as engine load increases in response to such a control parameter.

Figure 3:
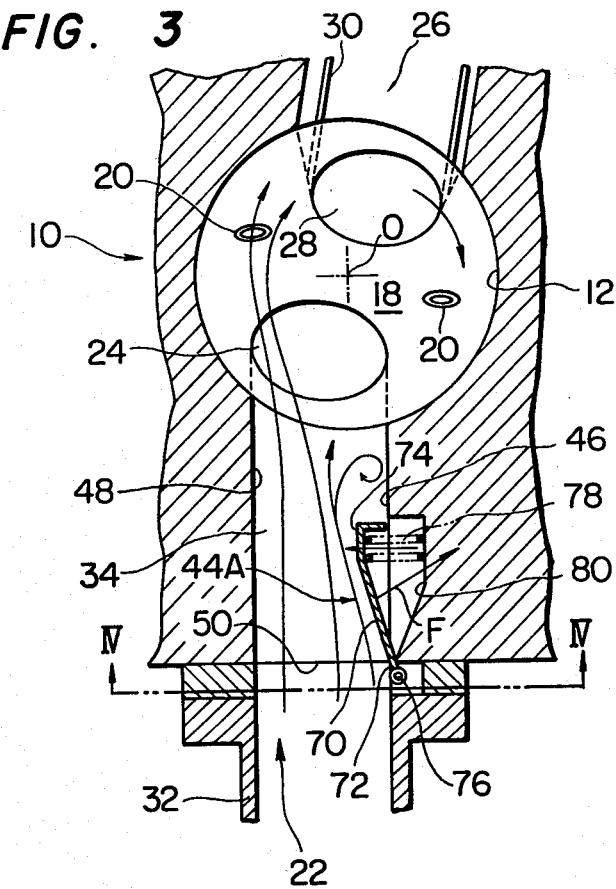
FIG. 3 is a transverse sectional diagrammatic view of a portion of an internal combustion engine showing a second embodiment of the invention.
Figure 4:
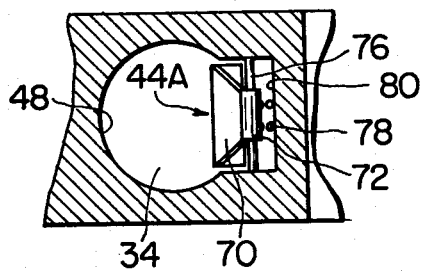
FIG. 4 is a section taken through line IV—IV shown in FIG. 3.

Referring to the second embodiment shown in FIGS. 3 and 4, this embodiment is substantially similar to the first embodiment except for the fact that a flow restrictor means 44A and control means for the flow restrictor means (of the second embodiment) is different from the counter parts of the first embodiment.

The flow retrictor means 44A takes the form of a flap 70 having an upstream end portion thereof 72, with respect to flow in the intake passageway 22, hinged to that inner wall portion 46 of the intake passageway 22 which is nearer to the cylinder than the other wall portion 48. A downstream end portion 74 of the flap 70 extends into the intake port passage 34 to restrict and deflect flow of the combustible charge passing through the intake passageway 22.

The upstream end portion 72 of the flap 70 is rotatably mounted on a fixed shaft 76 mounted in an area disposed adjacent the upstream end 50 of the intake port passage 34. The front surface of the flap 70 which is exposed to the flow in the intake port passage 34 is disposed as angled to the flow. On that side of the flap 70 which is adjacent the back surface of the flap 70, a spring means 78 is disposed in a recess 80 formed in the inner wall of the intake port passage 34 to yieldably bias the flap 70 in a direction in a sense to reduce effective flow are at the flow restrictor means 44A.

At low speed under light load operating conditions, the flap 70 is fully extended into the intake port passage 34 as illustrated FIGS. 3 and 4. At these conditions a flow pattern substantially similar to the first embodiment occurs and, as a result, a swirl with a high swirl rate is obtained at these conditions.

The external force F acting on the flap 70 to urge it, against the bias force f of the spring means 78, in the opposite direction in a sense to increase effective flow area of the flow restricting means 44A increases with an increase of flow velocity of the combustible charge passing through the intake passageway 22, the flow velocity increasing as engine load increases.

At high speed under high load operating conditions. therefore, the flap 70 is fully retracted from the intake port passage 34 into the recess 80 after clockwise rotation (as viewed in FIG. 3) about the fixed shaft 76 thereby to provide a maximum effective flow area of the flow restrictor means 44A, thus securing a sufficiently high volumetric efficiency of the engine at these conditions.

Figure 5:
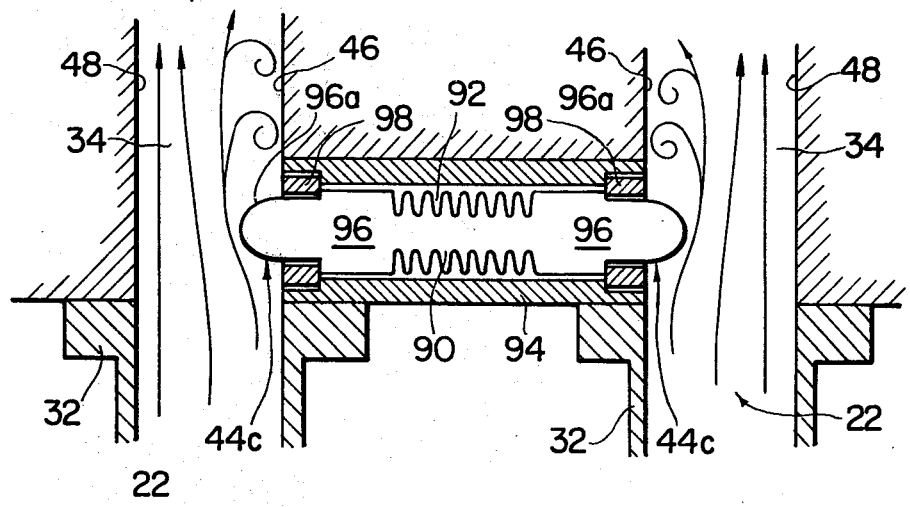
FIG. 5 is a transverse sectional diagrammatic view of a portion of an internal combustion engine showing a third embodiment of the invention.

Referring to the third embodiment shown in FIG. 5, this embodiment is substantially similar to the first embodiment (shown in FIGS. 1 and 2) except for the fact that a flow restrictor means 44C is actuated by a sealed bellows means 90 mounted in a chamber 92 communicating with an intake passageway 22 (in the third embodiment), whereas in the first embodiment (shown in FIGS. 1 and 2) the flow restrictor means 44 is actuated by the chamber means 54, which is air tight, communicating with the venturi 56 of the carburetor 58.

Referring to FIG. 5 a hollow sleeve 94 whose ends are opening to the adjacent two intake passageways 22 has mounted therein the bellows 90 which is partially evacuated to have a certain vacuum level for urging each of the flow restrictor means 44c in a direction in a sense to increase effective flow area in response to a decrease of an induction vacuum in the intake passageway 22. Each of the flow restrictor means 44C takes the form of a plunger 96 having a half-spherical head 96a protruding into the intake port passage 34 through one of the open ends of the hollow sleeve 94 and connected integrally with one end of the bellows 90. Protrusion movement of the plunger 96 is limited by an annular stopper 98.

At low speed under light load operating conditions, the bellows 90 is in the fully extended condition as illustrated in FIG. 5 to fully protrude each plunger 96 into the intake port passage 34.

As induction vacuum decreases toward the atmospheric value as load on the engine increases, the bellows is contracted due to difference, in pressure, between pressure within the bellows 90 and the induction vacuum transmitted to the chamber 92.

At high speed under high load operating conditions, therefore, each plunger 96 is fully retracted by the bellows 90 from the intke port passage 34.

Figure 6:
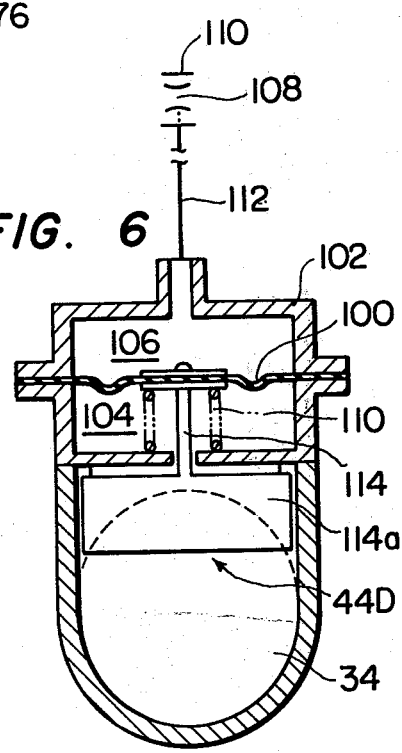
FIG. 6 is a cross sectional view of an intake passageway of an internal combustion engine showing a fourth embodiment of the invention.

Referring to the fourth embodiment shown in FIG. 6, this embodiment is substantially similar to the first embodiment (shown in FIGS. 1 and 2) except for the fact that a flow restrictor means 44D is actuated by a diaphragm means 100 (in the fourth embodiment), whereas, in the first embodiment (shown in FIGS. 1 and 2) the flow restrictor means 44 is actuated by the chamber means 54.

Referring to FIG. 6 a casing 102 defines a chamber. This chamber is divided by the diaphragm means 100 mounted in the casing 102 into a first subchamber 104 communicating with the intake port passage 34 and a second subchamber 106 communicating with a venturi 108 of a carburetor 110 connected to the intake port passage 34. Denoted by the reference numeral 112 is a passage connecting the subchamber 106 with the venturi 108. A spring means 110 is mounted within the subchamber 104 for yieldably biasing the flow restrictor means 44D in an upward direction (as viewed in FIG. 6) in a sense to increase effective flow area at the flow restrictor means, The diaphragm means 100 is operable in response to a difference, in pressure, between venturi vacuum transmitted to the subchamber 106 and the induction vacuum transmitted to the subchamber 104 to urge, against the bias action of the spring means 110 in a downward direction (as viewed in FIG. 6) in a sense to reduce effective flow area of the flow restrictor means 44D. Generally the diaphragm means 100 causes the flow restrictor means 44D to reduce its effective flow area as the induction vacuum increases with a decrease of the engine load.

If desired, the subchamber 106 may be open to the atmosphere instead of being connected to the carburetor venturi, with substantially the same result.

The flow restrictor means 44D takes the form of a plunger 114 fixed to the diaphragm means 100 and having a baffle plate 114a protruding into the intake port passage 34, as shown in FIG. 6.

Figure 7:
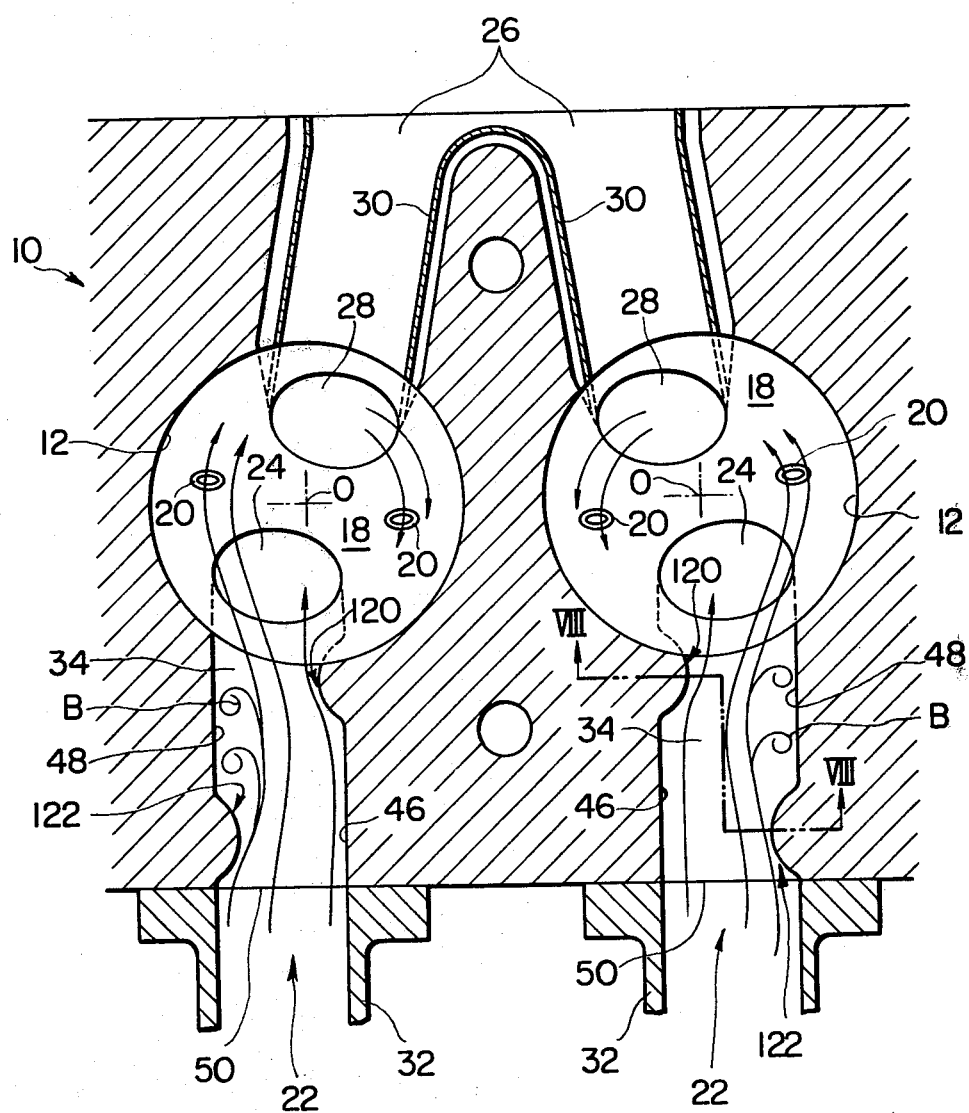
FIG. 7 is a transverse sectional diagrammatic view of a portion of an internal combustion engine showing a fifth embodiment of the invention.
Figure 8:
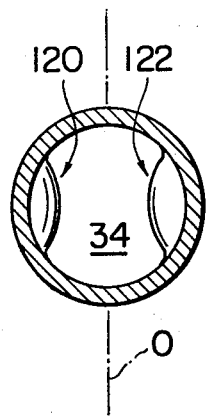
FIG. 8 is a section taken through line VIII—VIII shown in FIG. 7.

Turning now to FIGS. 7 and 8, the fifth embodiment shown in these Figures is different from the first embodiment in that swirl means (of the fifth embodiment) comprises a first flow restrictor means 120 and a second flow restrictor means 122, whereas the swirl means of the first embodiment comprises only one flow restrictor means 44.

The first flow restrictor means 120 is disposed on the wall portion 46 which is positioned nearer to the cylinder axis O than the other opposite wall portion 48, while, the second flow restrictor means 122 is disposed on the wall portion 48 and upstream of the first flow restrictor means 120.

Preferably, the first flow restrictor means 120 is positioned within an area disposed in the proximity of the downstream end of the intake port passage 34 and second flow restrictor means is positioned within an area in the proximity of the upstream end 50 of the intake port passage 34.

Both of the flow restrictor means takes the form of a half-spherical protrusion as shown in FIG. 7.

The above described arrangement of the two protrusions 120 and 122 will result in an increase of flow velocity of the combustible charge as entering into the cylinder 12 as compared to the first embodiment, thus providing a stronger swirl in the cylinder.

This is because the combustible charge is accelerated as it passes the second flow restrictor means 122 and directed toward the first flow restrictor means 120 due to deflection as it passes the second restrictor means 122 before the combustible charge is accelerated and deflected to enter into the cylinder 12 in substantially a tangent direction to the cylinder wall. Preferably the first flow restrictor means 120 is disposed in that zone wherein eddies B still exist.

The first and second flow restrictor means 120 and 122 are arranged to cause deflections of flow of the combustible charge in planes perpendicular to the cylinder axis O (see FIG. 8).

Figure 9:
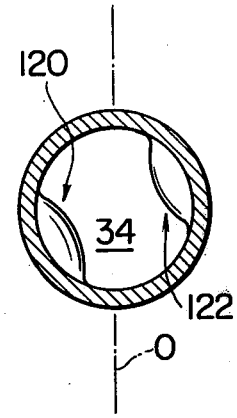
FIG. 9 is a view similar to FIG. 8 showing an alternative arrangement of the flow restrictors.

If desired, the first and second flow restrictor means 120 and 122 may be arranged to impart the combustible charge a force component along the cylinder axis O (see FIG. 9). With this arrangement the same swirl in the cylinder 12 could be obtained with an intake port passage having less height.

Figure 10:
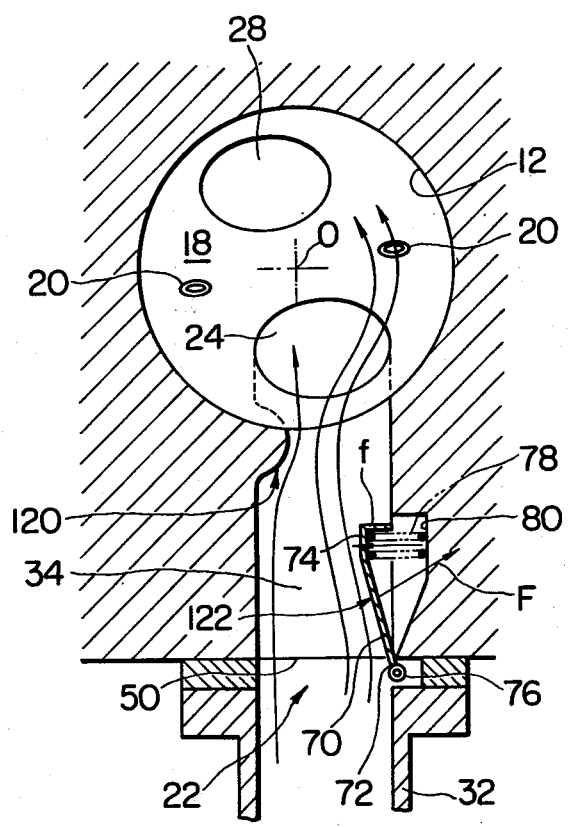
FIG. 10 is a transverse sectional diagrammatic view of a portion of an internal combustion engine showing sixth embodiment of the invention.

In order to secure sufficiently high volumetric efficiency of at high speed under high load operation conditions, it is desirable that as the flow restrictor means 122 a flap 74 and its associated control means similar to those shown in FIGS. 3 and 4 be used as shown in the sixth embodiment of FIG. 10.

Reverting to FIG. 2, it is confirmed that since there exist certain optimum relationship between angle A and cylinder diameter D and since the angle is a function of a height H of the intake port passage 34, i.e., a height between the middle of the downstream end of the intake port passage 34 and the middle of the upstream end 50 of the intake port passage 34, it is best to select the height of H within a range from 0.25D to 0.5D for obtaining sufficiently good result from the provision of swirl means.

What is claimed is:

1. An internal combustion engine comprising:
a cylinder with a cylinder axis;
a piston reciprocably slidable within said cylinder;
means defining an intake passageway having an intake port passage having an upstream end, with respect to the flow of a combustible charge passing through said intake port passage, and a downstream end opening to said cylinder, said downstream end of said intake port passage being positioned within a plane having an unit vector which is normal to said plane and has its origin placed at the middle of said downstream end, directed toward said piston and an area disposed in proximity of said cylinder axis; and
swirl means for causing the combustible charge passing through said intake passageway to swirl in said cylinder, said swirl means having a first flow restrictor means for restricting and directing and deflecting flow of the combustible charge passing through said intake passageway to urge the combustible charge to enter said cylinder in substantially a tangent direction to the cylinder wall;
said first restrictor means being disposed on that one of the two opposed inner wall portions of said intake passageway that is positioned nearer to said cylinder axis than the other wall portion;
said first flow restrictor means protruding into said intake passage within an area disposed in the proximity of said upstream end of said intake port passage;
said swirl means comprising:
control means whereby said first flow restrictor means varies the effective flow area of said flow restrictor means in response to load on the engine; and said control means comprising:
a carburetor with a venturi connected to said intake passageway;
a spring means yieldably biasing said first flow restrictor means in a direction in a sense to reduce the effective flow area of said first flow restrictor means; and
chamber means communicating with said venturi for urging, against the bias action of said spring means, said first flow restrictor means in the opposite direction in a sense to increase the effective flow area of said first flow restrictor means in response to vacuum at said venturi.

2. An internal combustion engine as claimed in claim 1, in which said first flow restrictor means comprises a plunger in said chamber means having a head protruding into said intake port passage and an area exposed to the vacuum in said chamber means.

3. In an internal combustion engine having a cylinder head with a combustion chamber and an intake port passage through which air flows leading to said combustion chamber;
projection means disposed the adjacent the upstream end of said passage for creating turbulent flow in the portion of the air flowing in said passage downstream of and in the shadow of said projection means, the remaining portion of the air flowing in said passage undergoing substantially laminar flow, said projection means and that portion of the air undergoing turbulent flow defining resilient throttling means which deflects the portion of the air undergoing laminar flow in a direction away from that portion undergoing laminar flow to be directed into said combustion chamber to induce all of the air entering said chamber to swirl in said chamber, the effect of said resilient throttling means decreasing as the velocity of the air flowing through said passage increases, so that at high engine speed the charging efficiency of the engine is substantially unimpaired by the provision of said projection means.

4. An internal combustion engine as claimed in claim 3 further comprising:
a second projection means disposed adjacent the downstream end of said intake port passage and which is disposed to deflect the portion of the air undergoind laminar flow toward that portion undergoing turbulent flow so that the portion undergoing laminar flow is forced to flow between said second projection means and said portion undergoing turbulent flow to undergo an increase in velocity and be directed into said combustion chamber in a direction different from that caused by said projection means but which induces all of the air entering said combustion chamber to swirl therein.

5. An internal combustion engine as claimed in claim 3, wherein said projection means comprises:
means defining a chamber;
a member movable from a first position in which it projects into the flow of air which flows through said intake port passage to a second position in which it is received in said chamber so as to not project into said flow of air, said member having a first surface exposed to said flow of air and a second surface facing said chamber so that when air flows through said intake port passage a pressure differential is developed across said first and second surfaces which biases said member toward said second position thereof, the bias increasing with the velocity at which the air flows; and
biasing means for biasing said member toward said first position thereof.

6. In an internal combustion engine having a cylinder, a piston reciprocable in said cylinder an an intake passage leading to said cylinder and through which air flows to said cylinder;
means defining a chamber;

a member disposed in said intake passage and movable from a first position in which it projects into said intake passage to a second position in which it is received in said chamber so as to not project into said intake passage, said member having a first surface exposed to the flow of air flowing through said intake passage and a second surface facing said chamber so that when air flows through said intake passage a pressure differential across said first and second surfaces biases with the velocity of the air flowing through said intake passage; and biasing means for biasing said member toward said first position thereof;

said member being so configured as to create turbulent flow in that portion of the air flowing in said intake passage downstream and in the shadow of said member when projected into said intake passage, the amount of turbulent flow decreasing as said member moves from said first position toward said second position thereof, said member and said turbulent flow defining resilient throttling means for deflecting the remaining portion of the air flowing in said intake passage which is undergoing substantially laminar flow and directing same into said cylinder so that the air enters said cylinder substantially tangentially with respect to the cylinder wall to induce all of the air in said cylinder to swirl, the arrangement behind such that low engine speed a high degree of swirl is induced and as the engine speed increases the effect of said resilient throttling means decreases so that high engine speed the charging efficiency of the engine is uneffected by said resilient throttling means.

7. An internal combustion engine as claimed in claim 6 wherein said member is a piston reciprocable in said chamber, said piston having a portion projectable into said intake passage and said biasing means is a spring biasing the piston to a position where said portion of said piston projects into said intake passage.

8. An internal combustion engine as claimed in claim 6 wherein said member is an anaroid bellows received in said chamber, said anaroid bellows having a portion projectable into said intake passage and said biasing means takes the form of the pressure differential existing between the interior of said bellows and the pressure prevailing in said chamber, first surface of said member being defined by the external surface of said portion of said bellows and said second surface being defined by the corresponding internal surface of said portion of said bellows.

9. An internal combustion engine as claimed in claim 6, wherein said member is a flap member hinged at one end thereof and which extends in the direction of the flow of air in said intake passage.

10. An internal combustion engine as claimed in claim 6, wherein said chamber is fluidly communicated with a venturi portion of said intake passage so as to be exposed to the vacuum developed therein via said flow of air through said intake passage.

11. An internal combustion engine as claimed in claim 6, wherein said chamber is fluidly communicated with the intake passage immediately downstream of said member.

12. An internal combustion engine as claimed in claim 6, wherein said chamber has an orifice which opens into said intake passage and said orifice is sealed by said member so as to define a variable volume space within said chamber.

13. In an internal combustion engine the method of introducing air into a cylinder of the engine comprising the steps of:

introducing air into an intake passageway leading to said cylinder so that said air undergoes substantially laminar flow in said passageway;

projecting a projection into said passageway at a location upstream of said cylinder thus causing turbulent flow in the air flowing downstream and in the shadow of said projection;

deflecting the portion of the air downstream of said projection which is undergoing laminar flow by using said projection and said air undergoing laminar flow, into said cylinder in a direction substantially tangential with respect to the cylinder wall, so that all of the air in said cylinder swirls therein.

14. A method as set forth in claim 13 further comprising the step of:

varying the degree of projection of said projection thus varying the amount of turbulent flow produced in accordance with the engine speed.

* * * * *